(12) United States Patent
Hertenberger et al.

(10) Patent No.: US 7,032,317 B2
(45) Date of Patent: Apr. 25, 2006

(54) ANGLE MEASURING INSTRUMENT AND PROCEDURE FOR THE PRODUCTION OF THE ANGLE MEASURING INSTRUMENT

(75) Inventors: Jürgen Hertenberger, Aich (DE); Sebastian Brandl, Altenmarkt (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/795,212

(22) Filed: Mar. 5, 2004

(65) Prior Publication Data

US 2004/0211072 A1    Oct. 28, 2004

(30) Foreign Application Priority Data

Mar. 7, 2003    (DE) ................. 103 11 098

(51) Int. Cl.
*G01B 5/24* (2006.01)

(52) U.S. Cl. ............................. 33/1 N; 33/1 PT; 33/706

(58) Field of Classification Search .................... 33/10, 33/1 PT, 1 N, 534, 755, 758, 614, 616, 618, 33/555.1, 555.4, 706–708
See application file for complete search history.

(56) References Cited

U.S. PATENT DOCUMENTS

| 6,087,748 A | 7/2000 | Donner |
| 6,098,295 A * | 8/2000 | Feichtinger ................. 33/1 PT |
| 6,481,115 B1 * | 11/2002 | Henshaw et al. .............. 33/645 |
| 6,523,268 B1 | 2/2003 | Böge |
| 6,612,048 B1 * | 9/2003 | Peterlechner et al. ........ 33/1 PT |
| 6,637,118 B1 * | 10/2003 | Feichtinger ................. 33/1 PT |
| 2002/0108259 A1 | 8/2002 | Feichtinger |
| 2004/0025357 A1 * | 2/2004 | Schroder .................... 33/1 PT |

FOREIGN PATENT DOCUMENTS

| DE | 87 17 505.3 U1 | 3/1989 |
| DE | 43 31 668 A1 | 3/1995 |
| DE | 199 56 833 A1 | 5/2001 |
| EP | 0 874 996 B1 | 6/2001 |
| EP | 1 231 452 A2 | 8/2002 |

* cited by examiner

*Primary Examiner*—Yaritza Guadalupe
(74) *Attorney, Agent, or Firm*—Brinks Hofer Gilson & Lione (57) ABSTRACT

A method for the production (mounting) of an angle measuring instrument, in which a graduation support, in the form of a flexible band having a scannable measuring graduation, is fixed on a support body, forming an annular portion, in such a way that the measuring graduation extends in a circumferential direction on an outer wall of an annular arrangement formed by the support body and the graduation support. The method includes fixing the graduation support on an inner annular wall of the support body and positioning the support body so that the support body only partly covers the graduation support in an axial direction.

31 Claims, 6 Drawing Sheets

ANGLE MEASURING INSTRUMENT AND PROCEDURE FOR THE PRODUCTION OF THE ANGLE MEASURING INSTRUMENT

Applicants claim, under 35 U.S.C. §119, the benefit of priority of the filing date of Mar. 7, 2003 of a German patent application, copy attached, Ser. No. 103 11 098.4, filed on the aforementioned date, the entire contents of which is incorporated herein by reference.

BACKGROUND OF THE INVENTION

1. Field of the Invention

The present invention relates to an angle measuring instrument and to a method for producing the angle measuring instrument.

2. Discussion of Related Art

One such angle measuring instrument includes a flexible (in particular, flexibly elastic, longitudinally rigid) band, for instance in the form of a steel band, which as a graduation support has a measuring graduation that can be scanned (for instance magnetically or optically) by a suitable scanner unit, and also includes an annular support body, that is, one that forms a ring or an annular portion surrounding a longitudinal axis and on which the graduation support is fixed extending annularly all the way around, or in other words again forming a ring or an annular portion. The measuring graduation is mounted on the outside of the flexible band in such a way that the measuring graduation extends in the circumferential direction on the outer wall of the annular arrangement formed by the support body and the graduation support.

From German Patent Disclosure DE 199 56 833 A1, it is known to fasten a tensible tape measure, by a chuck that has a turnbuckle, to the outer circumference of a circular table; the two free ends of the tape measure, connected to one another via the turnbuckle, are placed in an abutting relationship in such a way that across the abutment, precisely one graduation period results. Note that German Patent Disclosure DE 199 56 833 A1 corresponds to U.S. Pat. No. 6,523,268, the entire contents of which are incorporated herein by reference.

From European Patent Disclosure EP 0 874 996 B1, an angle measuring instrument is known in which a graduation support in the form of a plastic ring has a measuring graduation formed by magnet poles, and together with it is fixed by a cage ring on the outer wall of an annular support body in the form of a base ring. The measuring graduation disposed on the outer wall of the base ring by the plastic ring and cage ring can be scanned with a scanner unit, which scans the outer surface of the rotatable annular arrangement formed by the base ring, plastic ring, and cage ring. Note that European Patent Disclosure EP 0 874 996 B1 corresponds to U.S. Pat. No. 6,087,748, the entire contents of which are incorporated herein by reference.

In German Utility Model DE 87 17 505 U1, an angle measuring instrument is described in which a pulse ring is disposed on the outer jacket face of the outer ring of a wheel bearing. The pulse ring is secured to the outer jacket face of the outer ring by welding the two free ends of a band, forming the pulse ring and bent into a ring, to one another and pressing the pulse ring onto the outer ring.

For high-precision angle measuring systems, the fixation of a flexible tape measure on an annular body or a circular table, as described in DE 199 56 833 A1, has proved especially advantageous. However, the problem exists that the increased space requirement because of the turnbuckle is disadvantageous in certain applications, especially in small angle measuring systems. Furthermore, the imbalance represented by the turnbuckle, upon a rotary motion of the support of the measuring graduation at high rpm, can lead to high bearing stress and hence a short bearing life. Moreover, a permanent imbalance causes eccentricities that in turn generate a measurement error.

Joining the ends of a tape measure by welding, if the base body has small diameters, leads to correspondingly major bending stresses at the weld seam, which impair its strength. Moreover, the use of a welding method in creating a high-precision position measuring system is hindered by the problem that the heat development occurring during welding can change the length of the graduation periods in the region of the band ends to be welded.

OBJECT AND SUMMARY OF THE INVENTION

An object of the present invention is to create an angle measuring instrument which has a scannable measuring graduation on the outside of an annular arrangement formed by an annular support body and a graduation support, and which can be used particularly for high-precision angle measuring systems.

This object is attained according to the invention by the creation of an angle measuring instrument that includes a graduation support that has a flexible band having a scannable measuring graduation. A support body, surrounding a longitudinal axis and forming an annular portion, on which the graduation support is fixed, wherein the support body and the graduation support form an annular arrangement and wherein the measuring graduation extends in a circumferential direction on an outer wall of the annular arrangement. The graduation support is fixed on an inner annular wall of the support body and the support body only partly covers the graduation support in an axial direction, so that the measuring graduation is scannable on the outer wall of the annular arrangement.

Accordingly, the graduation support that has the measuring graduation is fixed on an inner annular wall of the support body; and that the support body only partly covers the graduation support in the axial direction, so that the measuring graduation can be scanned on the outer wall of the annular arrangement (formed by the graduation support and the support body).

An embodiment of the present invention, with a measuring graduation that can be scanned on the outer surface of an annular arrangement, enables simple fixation—which at the same time is suitable for high-precision measuring methods—of the graduation support on an annular support body in a way that until now was possible only for angle measuring instruments that could be scanned on the inner wall, as in German Patent Disclosure DE 43 31 668 A1.

The present invention is based on the recognition that the advantages associated with the fixation of a graduation support on the inner annular wall of an annular support body can also be utilized in annular arrangements of the kind in which the measuring graduation is meant to be scannable on the outer wall of the annular arrangement, if the support body that receives the graduation support is designed such that the regions of the graduation support that are provided with the measuring graduation are accessible to a scanner unit from the outside of the annular arrangement. In other words, the graduation support rests on the inner annular wall of the annular support body only with regions of the graduation support that are not provided with the measuring graduation, so that the measuring graduation is not covered by the inner annular wall of the annular support body.

In other words, the measuring graduation extends on the same surface of the graduation support with which the graduation support rests on the inner annular wall of the support body. The regions of the graduation support that rest on the inner annular wall of the support body, however, are free of the measuring graduation.

The measuring graduation of the present invention has the advantage that for angle measurement, it is suitable even in cases in which the graduation support has a small diameter and correspondingly a great curvature and/or is moved at a high speed of rotation. Moreover, the measuring graduation is especially well protected because of the fact that the graduation support is offset inward relative to the outer wall of the annular support body. The embodiment according to the present invention is suitable for use both in a graduation support with an incremental graduation and a graduation support with an encoded measuring graduation from which absolute position information can be obtained. If there is not only an incremental graduation but also a reference track on the graduation support, then this track must not be covered by the inner annular wall of the support body, either.

An embodiment of the present invention can furthermore be used with any arbitrary physical scanning principles for scanning the measuring graduation; for instance, it can be used with either a photoelectrically scannable measuring graduation or a magnetically scannable measuring graduation.

In one version of the present invention, the graduation support protrudes, with at least its portion provided with the measuring graduation, past the support body in the axial direction.

In another version of the present invention, the support body has a recess extending annularly all the way around, with an axial length such that the portions of the graduation support that are provided with the measuring graduation extend downstream of this recess and are thus accessible to a scanner unit disposed on the outside of the support body.

The length of the graduation support and the length of the inner annular wall of the support body in the circumferential direction are adapted to one another such that the graduation support rests without play, in particular with only slight initial tension, on the inner annular wall of the support body. This makes it possible to fix the graduation support to the annular support body without having to weld the two ends of the flexible graduation support (scale band) to one another or connect them by a turnbuckle. When a circular-annular support body is used, this makes it possible in particular to construct the annular arrangement rotationally symmetrically without creating an imbalance. A version of the graduation support such that it can be snapped against the inner annular wall of the support body, utilizing the familiar "click" effect, as in DE 43 31 668 A1, is especially preferred.

In one version of the present invention, the graduation support is fixed on the inner annular wall without external means, solely by the intrinsic tension oriented outward against the inner annular wall. In another version, additional fastening means, such as an adhesive or a soldering agent, are provided for fixing the graduation support to the inner annular wall.

An embodiment according to the present invention can be employed especially advantageously if the graduation support is formed by a band, extending between two free ends, whose ends abut when the graduation support is fixed on the inner annular wall of the support body. In principle, however, it can also be employed if the graduation support is formed by a flexible endless band.

An embodiment of the present invention can also be used in the case where in the installed state the graduation support forms an annular portion or annular sector, that is, a split ring which extends along the support body over an angle of less than 360q. In that case, the support body itself can be embodied as either a closed ring, completely surrounding the longitudinal axis of the arrangement, or an annular portion or annular sector. In that case, it is understood that the free ends of the graduation support, spaced apart from one another (in the circumferential direction of the annular arrangement), cannot be braced against one another. Stop faces must therefore be provided on the support body, between which the graduation support is clamped, so that it rests with its intrinsic tension (radially outward-oriented initial tension) against the inner wall of the support body. The appropriate stop faces on the inner annular wall of the support body can be formed by the head of a fastening element, such as the head of a screw or a rivet head. Moreover, suitable stop faces can be fixed on the inner annular wall of the support body by material engagement (such as welding) or formed integrally onto it. For further details of an angle measuring instrument with an annular graduation support which extends over only an annular sector, see European Patent Disclosure EP 1 231 452 A2. Note that European Patent Disclosure EP 1 231 452 A2 corresponds to U.S. patent application Publication No. U.S. 2002108259 A1, the entire contents of which are incorporated herein by reference.

For axial fixation of the graduation support in one direction, the support body has at least one protrusion, which protrudes radially inward from the inner annular wall of the support body and is preferably embodied as extending all the way around along the inner annular wall.

The annular arrangement formed by the support body and the graduation support fixed on it is disposed on a rotatably supported drum, for instance in the form of a circular table, in such a way that by an associated stationary scanner unit, which scans the outer wall of the annular arrangement and thus the measuring graduation provided on the outside of the graduation support, the angle of rotation of the drum can be determined. For fixing the annular arrangement, formed by the support body and the graduation support, to the rotatably supported drum, suitable fastening means are provided, for instance in the form of an adhesive and/or in the form of positive-engagement elements. In one version, an additional mounting ring secured to the drum serves the purpose of axial and/or radial securing. In another version, a protrusion is formed directly onto the drum itself and is intended for axially and/or radially securing the annular arrangement formed by the support body and the graduation support.

The drum can furthermore have a recess, extending all the way around, for receiving an angled portion of the support body.

A method for the production (mounting) of an angle measuring instrument, in which a graduation support, in the form of a flexible band having a scannable measuring graduation, is fixed on a support body, forming an annular portion, in such a way that the measuring graduation extends in a circumferential direction on an outer wall of an annular arrangement formed by the support body and the graduation support. The method includes fixing the graduation support on an inner annular wall of the support body and positioning the support body so that the support body only partly covers the graduation support in an axial direction.

Accordingly, the graduation support is fixed on the inner annular wall of the support body in such a way that the support body covers the graduation support in the axial direction only in those regions not provided with the measuring graduation, so that the measuring graduation can be scanned on the outer wall of the annular arrangement by a suitable scanner unit.

The fixation of the graduation support on the inner annular wall of the support body can be done selectively and free of external device, solely by the intrinsic tension of the graduation support (that is, a radially outward-oriented initial tension), or by using additional connections, such as an adhesive.

In order to place the graduation support with its surface extending all the way around against the inner annular wall of the support body, it can be provided in particular that the graduation support is snapped against the inner annular wall in the manner of a "clicker assembly".

To make it easier to place the graduation support against the inner annular wall of the support body, the annular support body can be radially widened on its inner annular wall before the fixation of the graduation support. In this respect it can be provided that the graduation support is first placed with overlapping free ends against the inner annular wall of the support body; next, for instance by a mechanical widening device, the support body is widened, and then the free ends of the graduation support are made to abut one another. When the widening device is removed after the graduation support has been thus mounted on the inner annular wall of the support body, the annular support body yields inward somewhat because of its intrinsic tension; that is, its radius decreases again slightly, so that the graduation support then rests without play on the inner annular wall of the support body.

In another version of the present invention, the support body is heated to increase its radius, and the graduation support is placed against the inner annular wall of the support body in the heated state of the support body. In the ensuing cooling down, with the attendant thermal shrinkage of the annular support body, the requisite initial tension of the graduation support is established.

Conversely, the graduation support can be tensed radially inward in order to fix it to the support body.

Since the band forming the free ends of the graduation support cannot readily adapt itself to the radius of curvature of the inner wall of a support body, it is advantageous, especially when the support body has a small diameter, to pre-bend the free ends of the graduation support. The pre-bending radius should be selected such that in the later relaxation of the free ends of the graduation support, a curvature is established that matches the curvature (that is, the radius of curvature) of the inner annular wall of the support body.

After the fixation of the graduation support on the inner annular wall of the support body, the annular arrangement formed by these two structural groups is fixed on the outer circumference of the particular rotatable drum whose angle of rotation is to be determined by the measuring graduation provided on the annular arrangement. To that end, the measuring graduation extending on the outer circumference of the drum is scanned by a scanner unit which is stationary next to the outer circumference of the drum, with slight spacing from the measuring graduation.

Further characteristics and advantages of the present invention will become apparent from the ensuing description of an exemplary embodiment in conjunction with the drawings.

BRIEF DESCRIPTION OF THE DRAWINGS

FIG. 1b is an enlargement of a portion of FIG. 1a;

FIG. 1c is a plan view on the mounting ring and the graduation support of FIG. 1a, together with an embodiment of a scanner unit for scanning the measuring graduation in accordance with the present invention;

FIG. 1d is a plan view on a detail of the graduation support of FIGS. 1a–1c;

FIG. 3b is a plan view on the chuck of FIG. 3a;

DETAILED DESCRIPTION OF THE PREFERRED EMBODIMENTS

Figure 1A:
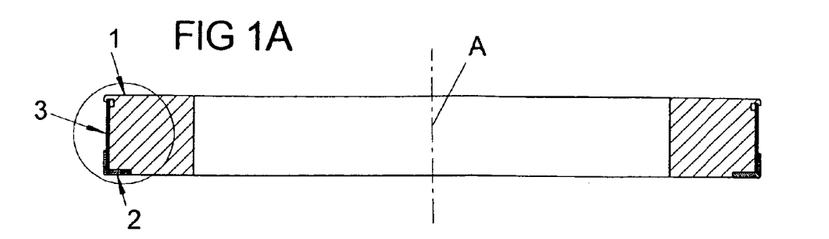
FIG. 1a is a cross-sectional view through an embodiment of a rotatably supported drum, on the outer jacket face of which an embodiment of a mounting ring is disposed that receives an embodiment of a graduation support that is provided with a measuring graduation in accordance with the present invention.
Figures 1B, 1C, 1D:
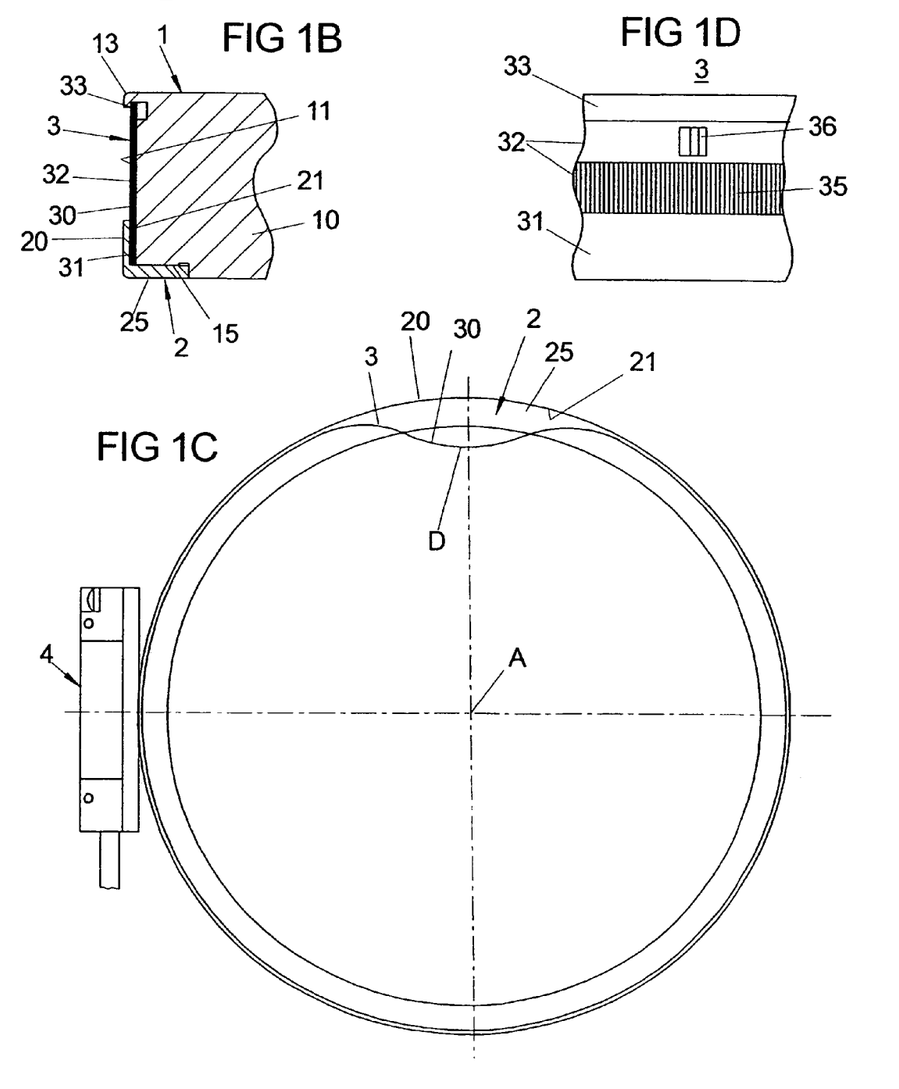

In FIGS. 1a and 1b, a drum 1 is shown which is rotatable about an axis A and whose angle of rotation at a given time can be ascertained by a measuring graduation (for instance, one that can be scanned photoelectrically) provided on the outer jacket face 11 of the drum 1, the drum being formed by an annular base body 10. The term "drum" means any arbitrary body rotatable about its longitudinal axis and having a cylindrical outer contour, whose angle of rotation is to be determined by the measuring graduation.

The measuring graduation extends on the outer surface 30 of a graduation support 3 in the circumferential direction of the drum 1; the graduation support is disposed on the outer jacket face 11 of the drum 1 by a mounting ring 2. The mounting ring 2 and the graduation support 3 form a preassembled structural group, which is secured as a preassembled annular arrangement to the outer jacket face 11 of the drum 1. This annular arrangement is also shown separately in FIG. 1c.

The support body, in the form of a mounting ring 2, that receives the graduation support 3 includes an annular base body 20 as well as a protrusion 25, angled radially inward from the annular base body 20 and extending all the way around and serving to fix the graduation support 3 axially. The graduation support 3, formed by a finite flexible band, such as a steel band, rests with its outer surface 30 on the inner annular wall 21 of the base body 20 of the mounting ring 2. In the axial direction A, the graduation support 3 protrudes past the base body 20 of the mounting ring 2, on the face end of the mounting ring remote from the angled protrusion 25. Accordingly, a first axial portion 31 of the outer surface 30 of the graduation support 3 is covered by the base body 20 of the mounting ring 2, while an adjoining axial portion 32 of the graduation support 3 protrudes past the base body 20 of the mounting ring 2 and thus is not covered by it.

The first axial portion 31 of the graduation support 3 serves as a fastening portion, in the region of which the graduation support 3 rests with its outer surface 30 against the inner annular wall 21 of the mounting ring 2 by intrinsic tension. In addition to utilizing the intrinsic tension, a connection can also be provided between the fastening portion 31 of the graduation support 3 and the mounting ring 2 by an adhesive or other suitable joining devices.

The second axial portion 32 of the graduation support 3, protruding past the base body 20 of the mounting ring 2, carries the measuring graduation or measuring graduations, which can be scanned by a (stationary) scanner unit 4 provided for the purpose. The measuring graduation or measuring graduations can be for instance an incremental track and optionally an additional reference track disposed beside it, or a code track containing absolute position information.

In FIG. 1c, it is shown as an example that the graduation support 3, formed by a flexible band, can be snapped with its outer surface 30 against the inner annular wall 21 of the mounting ring 2, utilizing the so-called "click effect". This means that after the graduation support 3 is placed with its outer surface 30 against the inner wall 21 of the mounting ring 2, a deformation region D initially forms because of a certain excess length of the graduation support 3; in this region, the graduation support 3 does not rest on the inner annular wall 21 but instead protrudes inward from it. Because this deformation region D of the graduation support 3 is pressed outward radially (with respect to the center axis A) against the inner annular wall 21, the flexible graduation support 3 presses with its outer surface 30, in the region of its fastening portion 31, against the inner annular wall 21. The intrinsic tension thus generated can already be sufficient to fix the graduation support 3 on the mounting ring 2 permanently. Alternatively, however, further joining devices can be used for securing the fastening portion 31 of the graduation support 3 additionally to the inner annular wall 21 of the mounting ring 2, for instance by adhesive bonding. As a result of the additional fixation of the graduation support 3 on the mounting ring 2 by adhesive bonding or the like, it is possible in particular to prevent relative motion between the graduation support 3 and the mounting ring 2 during dynamic alternating operation. Note that such dynamic alternating operation is defined as the rapid change of the movement direction. High rotary accelerations occur during these dynamic alternating operations, which may result in the detachment of the graduation support from the mounting ring if the present invention is not employed.

The annular arrangement comprising the mounting ring 2 and the graduation support 3 is then, as a preassembled structural group, disposed on and secured to the outer jacket face 11 of the drum 1 by being slipped on axially. For this purpose, the inward-angled protrusion 25 of the mounting ring 2 engages a corresponding recess 15 in the base body 10 of the drum 1, and the graduation support 3 engages a detent lug 13, on the outer jacket face 11 of the drum 1, from behind with a third axial portion 33, which axially adjoins the portion 32 that is provided with the measuring graduation. The annular arrangement comprising the mounting ring and the graduation support 3 can be additionally secured to the outer jacket face 11 of the drum 1 by adhesive bonding, soldering, or other suitable joining devices.

As a result, after the mounting process is concluded, the measuring graduation provided on the outside of the second axial portion 32 of the graduation support 3 forms a component of the outer wall of the annular arrangement formed by the mounting ring 2 and the graduation support 3, so that for ascertaining the angular position of the drum 1, the measuring graduation can be scanned by a scanner unit 4 disposed on the outside of the drum 1. At the same time, the graduation support 3 is fixed with its outer surface 30 on the inner annular face 21 of the mounting ring 2. This is achieved by providing that only one axial portion 31 of the outer surface 30 of the graduation support 3 is used for securing the graduation support 3 to the inner annular wall 21, while a second portion 32, extending axially past the mounting ring 2, is provided on its outside with the measuring graduation to be scanned.

From the plan view shown in FIG. 1d of a portion of the graduation support 3, it is clear that both an incremental track 35 with a periodic measuring graduation and a reference marking track with at least one reference marking 36 extend along the second, middle axial portion 32 of the graduation support 3, and that in the mounted state of the graduation support 3 on the mounting ring 2, they each extend (see FIGS. 1a and 1b) in the circumferential direction (about the longitudinal axis A) on the outer surface 30 of the graduation support 3. Besides axial portion 32 there are two further axial portions 31, 33 of the graduation support 3 that are each free of any elements of the measuring graduation and can therefore be surrounded for the sake of fastening, as shown in FIGS. 1a and 1b, by the inner annular wall 21 of the mounting ring 2 or the detent lug 13 of the drum 1, without impairing the function of the measuring graduation (incremental track 35) or the associated reference marking track (with reference markings 36).

Figure 1E:
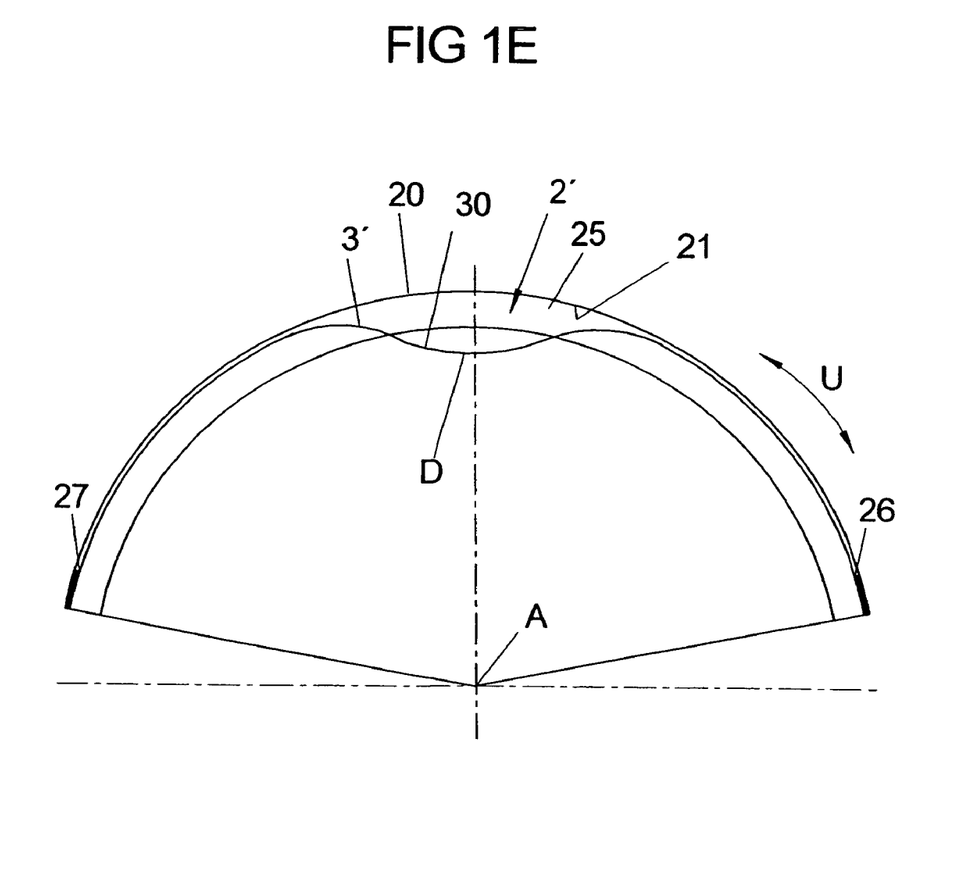
FIG. 1e is a plan view on a mounting ring and a graduation support of FIG. 1c, but here the mounting ring and the graduation support extend annularly over an angle of somewhat less than 180q.

FIG. 1e, in a modification of the exemplary embodiment of FIGS. 1a–1c, shows a mounting ring 2' and a graduation support 3', which each extend in the circumferential direction U of the annular arrangement over only an angle of markedly less than 360% namely an angle of just under 180q For fixing the graduation support 3' to the mounting ring 2' by intrinsic tension (radially outward-oriented initial tension), two stops 26, 27 are provided on the two ends (the outer ends in the circumferential direction) of the mounting ring 2', and the free ends of the graduation support 3' are braced on these stops. These stops 26, 27 are formed by radially inward-projecting protrusions of the inner annular wall 21 of the mounting ring 2'. These protrusions can be integrally formed onto the inner annular wall 21, for instance, or joined to it by material engagement (in particular by welding). In addition, fasteners, for instance in the form of a screw or a rivet, can be disposed on the mounting ring 2' and form the appropriate stops. For further details of an angle measuring instrument in which the graduation support extends over an angle of less than 360q, see EP 1 231 452 A2.

Aside from the length of the mounting ring 2' and of the graduation support 3' in the circumferential direction, the annular arrangement shown in FIG. 1e is an identical match to those described in conjunction with FIGS. 1a–1c.

It should also be noted that the length of the graduation support 3' in the circumferential direction U over an angle of less than 360q does not at all dictate a correspondingly reduced length of the mounting ring 2' in the circumferential direction. It is understood that a mounting ring 2 (as shown in FIGS. 1a–1c) extending all the way around in the circumferential direction can also be combined with a graduation support 3' (as shown in FIG. 3c) that extends around only a sector in the circumferential direction.

If the stops 26, 27 that serve to brace the free ends of the graduation support 3' are intended to protrude farther inward in the radial direction than a distance equivalent to the thickness of the graduation support 3 in order to make enlarged stop faces available, then in that region the drum 1 would require a cutout, for instance in the form of a lathe-made cutout, extending in the circumferential direction.

Figure 2:
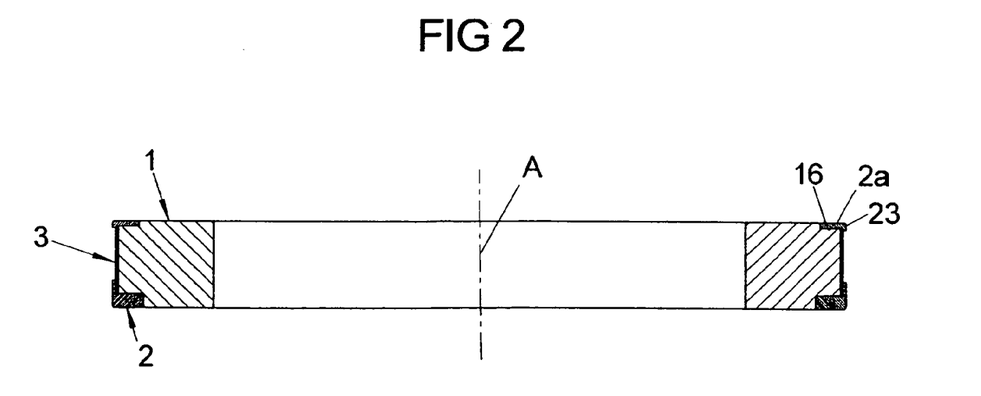
FIG. 2 shows a modification of the exemplary embodiment of FIG. 1a, in which two mounting rings are provided for disposing a graduation support on the outer jacket of the drum in accordance with the present invention.

FIG. 2 shows a modification of the measuring instrument of FIG. 1a, in which the difference is that for fixing the annular arrangement formed by the mounting ring 2 and the graduation support 3 to the outer jacket face 11 of the drum 1, instead of a lug formed onto the base body 10 of the drum 1 (as shown in FIGS. 1a and 1b), a second mounting ring 2a is used, which is placed in a recess 16 of the base body 10 of the drum 1 and which with a detent lug 23 grips the third axial portion 33 of the graduation support 3. Accordingly, in this exemplary embodiment, a mounting ring 2 and 2a are assigned to the two axial portions 31, 33, respectively, of the graduation support 3 that are disposed one on each side of the axial portion 32 that is provided with the measuring graduation. The additional mounting ring 2a can be secured to the drum either before or after the preassembled annular arrangement includes the first mounting ring 2 and the graduation support 3 has been slipped onto the outer jacket face of the drum 1.

Figure 3A:
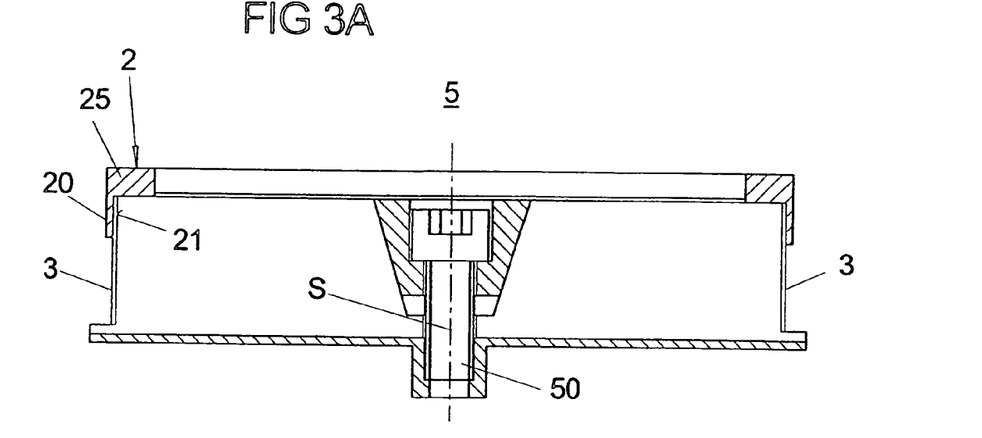
FIG. 3a is a cross section through an embodiment of a chuck for the widening of the mounting ring of FIG. 1a in accordance with the present invention.
Figure 3B:
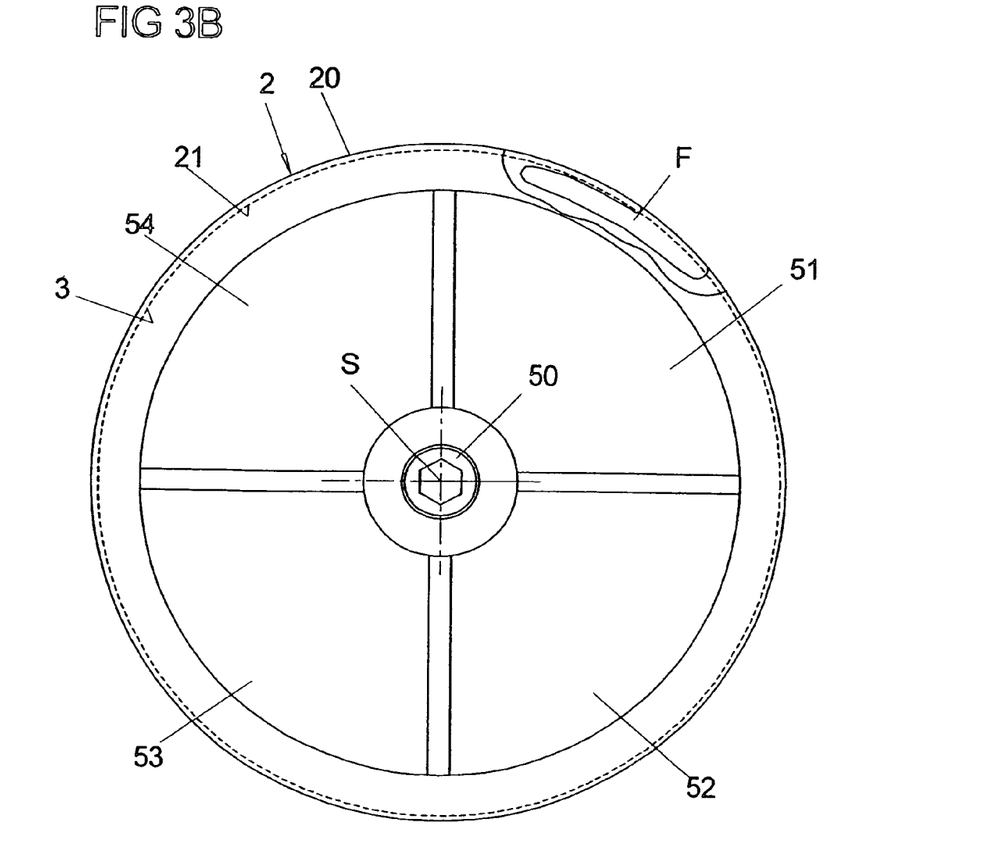
Figure 3C:
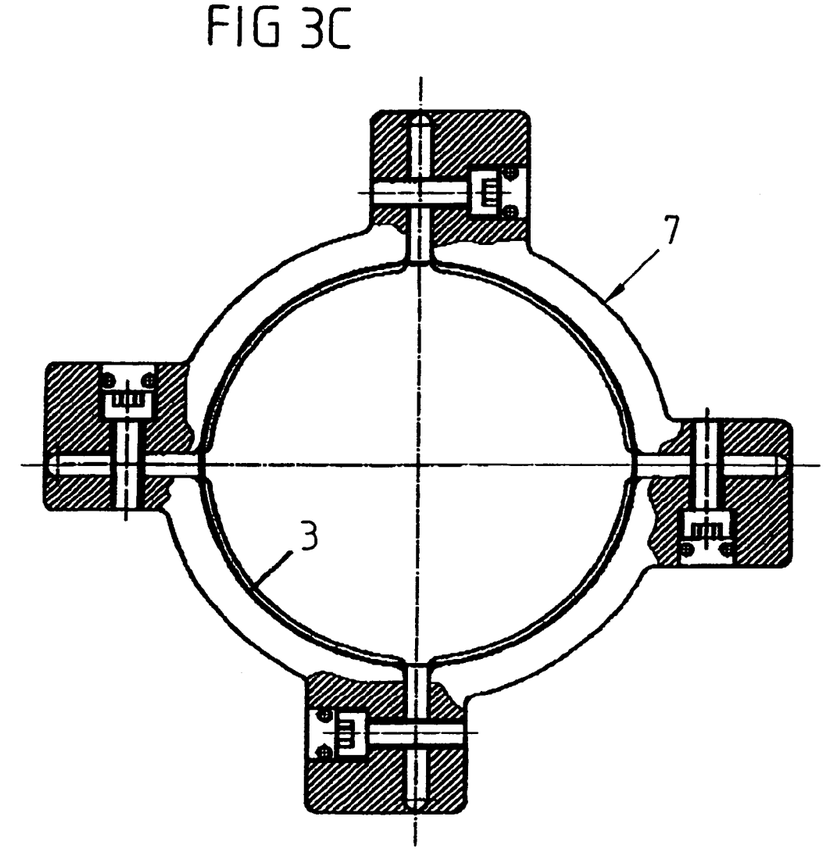
FIG. 3c is a plan view on an embodiment of a mounting device for tensing the graduation support of FIG. 1a inward in the radial direction in accordance with the present invention.

FIGS. 3a and 3b show a device 5 for widening the mounting ring 2. This device includes a central actuating device 50, by which a total of four tension blocks 51, 52, 53, 54 can be displaced outward radially (relative to a central clamping axis S), on the principle of a wedge.

Each of these tension blocks 51, 52, 53, 54 sweeps with its outer surface over a circular segment of barely 90q and also rests with this outer surface, forming a quarter circle, along the graduation support 3 on the inner annular face 21 of the base body 20 of the mounting ring 2. That is, first, the graduation support 3 is placed in the mounting ring 2, before the device 5 for widening the mounting ring comes into use. The graduation support 3 is first placed in the mounting ring 2 in such a way that the two free ends of the graduation support 3 overlap. That is, the graduation support 3 is initially received only temporarily on the mounting ring 2, and it is braced radially on the inner annular wall 21 and axially on the inward-angled protrusion 25. In this state, the device 5 for widening the mounting ring 2 is then introduced into the internal annular chamber of this ring. For the overlapping ends of the graduation support 3, a corresponding cutout F is provided.

Next, the tension blocks 51, 52, 53, 54 are moved radially outward, and the mounting ring 2 is widened in the region of its base body 20 far enough that the previously overlapping ends of the flexible graduation support 3 just enter into an abutting relation with one another. The graduation support 3 then rests with radial initial tension outward on the inner annular wall 21 of the mounting ring 2.

The use of such a mounting ring for the fixation of the graduation support 3 on the inner annular wall 21 of the mounting ring 2 is preferable particularly whenever the mounting ring 2 has comparatively small diameters and the fixation of the graduation support 3 on the inner annular wall 21 of the mounting ring 2 is impossible, or can be done only with difficulties. This is typically true for diameters of less than 200 mm.

As alternative to widening the mounting ring 2 by a mechanical device 5, the mounting ring 2 can also be widened by heating; then the flexible graduation support can be placed in it such that the ends of the graduation support are in an abutting relation. In the ensuing cooling down of the mounting ring 2, its diameter decreases again, and the requisite initial tension of the flexible graduation support outward is established.

Figure 3D:
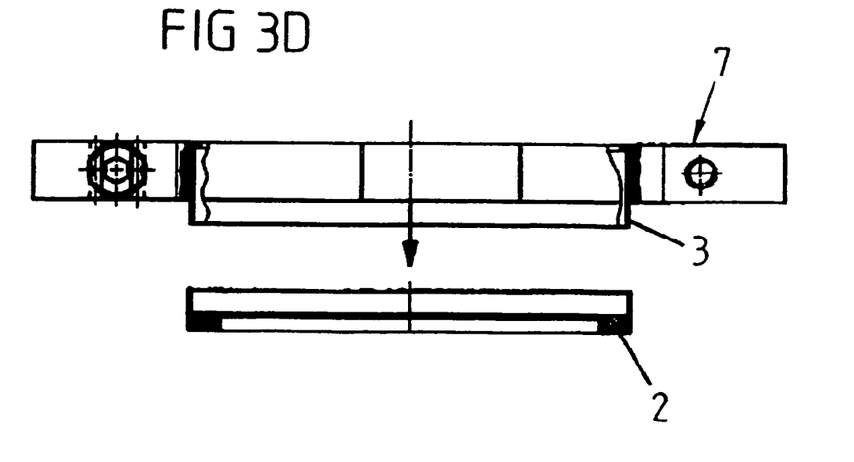
FIG. 3d is a cross section through the arrangement of FIG. 3c, together with an embodiment of a graduation support and a mounting ring in accordance with the present invention.

Instead of widening the mounting ring 2, it can conversely be provided that the graduation support 3 is compressed by a device 7 in the form of a chuck, so that the graduation support 3 can be introduced into the mounting ring 2 with initial tension; see FIG. 3d. The chuck 7 is subsequently relaxed and can be pulled off.

Figure 4:
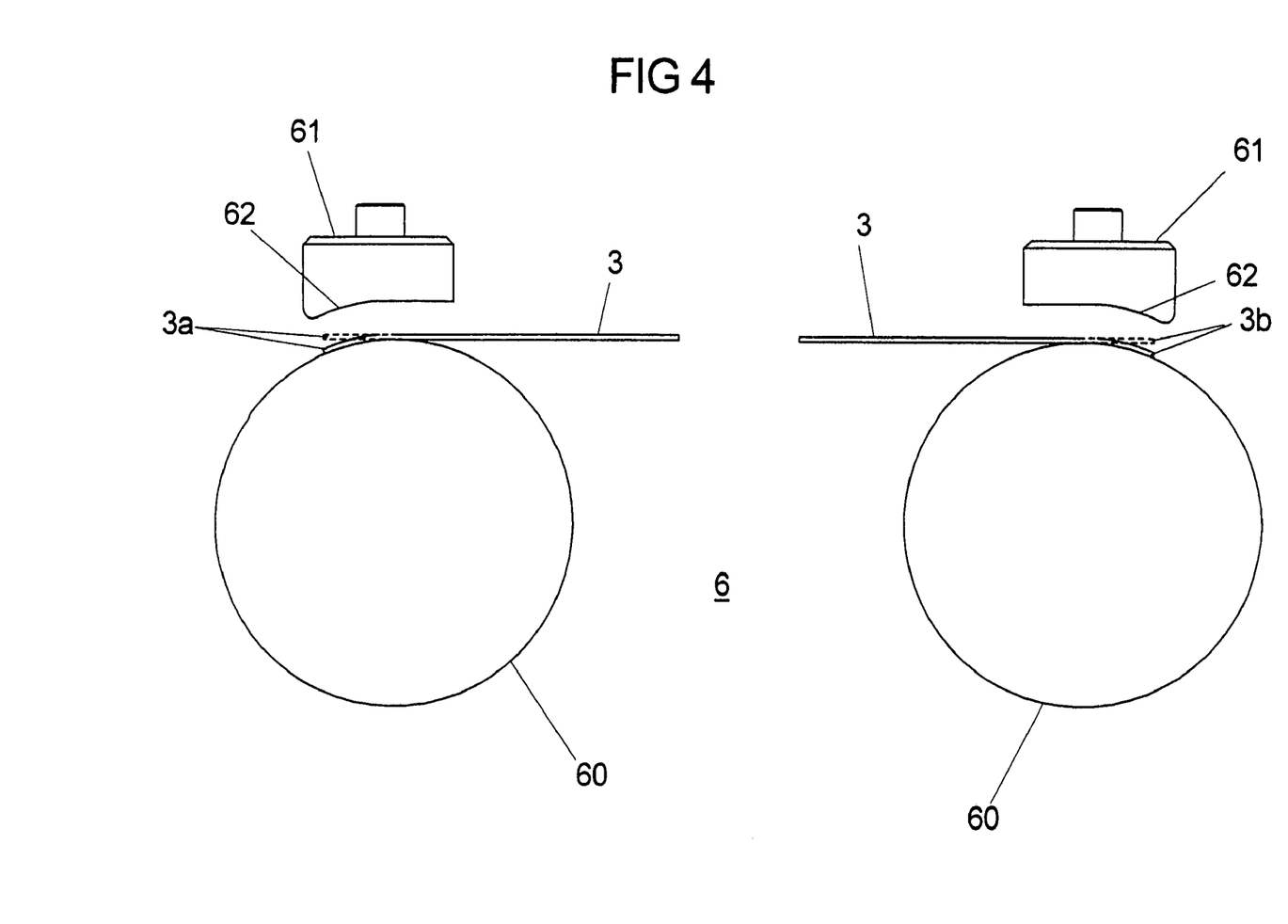
FIG. 4 shows an embodiment of a device for pre-bending the ends of a flexible graduation support in accordance with the present invention.

FIG. 4 shows a device 6 for pre-bending the end portions 3a, 3b of a flexible graduation support 3 before the flexible graduation support 3 is placed in a suitable mounting ring. The graduation support 3 is placed in the region of each of its free ends 3a, 3b against a respective cylindrical base body 60, with which a punch 61 with a punch face 62 that forms a portion of a cylinder is associated. Guiding the respective punch 61 with its punch face 62 in the bending direction against the associated base body 60 with the interposition of the respective end portion 3a, 3b causes the end portions 3a, 3b of the flexible graduation support 3 to be pre-bent to a radius of a curvature that is determined by the radius of the cylindrical base body 60. The pre-bending radius is selected such that upon relaxation of the ends of the scale band, after the placement in a mounting ring, a radius of curvature corresponding to the radius of the mounting ring is established.

Besides the exemplary embodiments described, it is understood that alternative variants also exist within the scope of the present invention.

We claim:

1. An angle measuring instrument, comprising:
   a graduation support comprises a flexible band having a scannable measuring graduation; and
   a support body, surrounding a longitudinal axis and forming an annular portion, on which said graduation support is fixed, wherein said support body and said graduation support form an annular arrangement and wherein said measuring graduation extends in a circumferential direction on an outer wall of said annular arrangement;
   wherein said graduation support is fixed on an inner annular wall of said support body; and said support body only partly covers said graduation support in an axial direction, so that said measuring graduation is scannable on said outer wall of said annular arrangement.

2. The angle measuring instrument of claim 1, wherein said support body is in circular-annular form, so that it forms at least a portion of a circular ring.

3. The angle measuring instrument of claim 1, wherein said graduation support protrudes past said support body in said axial direction.

4. The angle measuring instrument of claim 1, wherein said support body defines a recess, extending around said longitudinal axis and having a predetermined axial length in which said graduation support extends.

5. The angle measuring instrument of claim 1, wherein said graduation support extends on said inner annular wall of said support body along an entire circumference of said inner annular wall.

6. The angle measuring instrument of claim 1, wherein a length of said graduation support and a length of said inner annular wall of said support body in said circumferential direction are adapted to one another such that said graduation support rests without play on said inner annular wall of said support body.

7. The angle measuring instrument of claim 1, wherein said graduation support is fixed on said inner annular wall by intrinsic tension of said graduation support.

8. The angle measuring instrument of claim 1, wherein said graduation support is fixed on said inner annular wall by an adhesive.

9. The angle measuring instrument of claim 1, wherein said graduation support is snapped against said inner annular wall.

10. The angle measuring instrument of claim 1, wherein said graduation support is formed by a finite band, extending between two ends that abut one another when said graduation support is fixed on said inner annular wall of said support body.

11. The angle measuring instrument of claim 1, wherein said graduation support forms an annular portion which extends in said circumferential direction over an angle of less than 360°.

12. The angle measuring instrument of claim 11, wherein said graduation support is braced with a pair of free ends of said graduation support in said circumferential direction, each on a respective stop of said support body.

13. The angle measuring instrument of claim 1, wherein said support body has at least one protrusion for axial fixation of said graduation support.

14. The angle measuring instrument of claim 1, further comprising a scanner unit for scanning said measuring graduation and that is associated with said graduation support, wherein said scanner unit is provided and disposed for scanning an axial region of said outer wall of said annular arrangement.

15. The angle measuring instrument of claim 1, wherein said annular arrangement is disposed on a rotatably supported drum.

16. The angle measuring instrument of claim 15, wherein said annular arrangement is fixed on said drum using an adhesive and/or a positive-engagement element.

17. The angle measuring instrument of claim 15, further comprising an additional mounting ring provided for axial and/or radial securing of said annular arrangement.

18. The angle measuring instrument of claim 15, wherein said drum has a protrusion formed thereon, said protrusion extends along an outer circumference of said drum, is provided for axial and/or radial securing of said annular arrangement.

19. The angle measuring instrument of claim 15, wherein said drum has a recess for receiving an angled portion of said support body.

20. A method for producing an angle measuring instrument, in which a graduation support, in the form of a flexible band having a scannable measuring graduation, is fixed on a support body, forming an annular portion, in such a way that said measuring graduation extends in a circumferential direction on an outer wall of an annular arrangement formed by said support body and said graduation support, said method comprising:

fixing said graduation support on an inner annular wall of said support body; and positioning said support body so that said support body only partly covers said graduation support in an axial direction.

21. The method of claim 20, wherein said fixing is accomplished by intrinsic tension, without external devices.

22. The method of claim 20, further comprising snapping said graduation support against said inner annular wall.

23. The method of claim 20, further comprising radially widening said support body before said fixing.

24. The method of claim 23, further comprising:

initially placing said graduation support against said inner annular wall, wherein free ends of said graduation support overlap one another; and subsequent to said radially widening said support body, said free ends of said graduation support come to abut one another.

25. The method of claim 24, further comprising prebending said free ends prior to said initial placing said graduation support against said inner annular wall of said support body.

26. The method of claim 23, wherein said radially widening is performed by a mechanical device.

27. The method of claim 23, wherein said radially widening is performed by using heat.

28. The method of claim 27, further comprising cooling and shrinking said support body subsequent to said radially widening so that said graduation support assumes a defined intrinsic tension.

29. The method of claim 20, further comprising compressing said graduation support radially inward prior to said fixing.

30. The method of claim 29, wherein said compressing is performed by a mechanical device.

31. The method of claim 20, further comprising disposing said annular arrangement onto a rotatable drum and joined to said rotatable drum subsequent to said fixing.

* * * * *